United States Patent
Olfat et al.

(10) Patent No.: US 10,624,103 B2
(45) Date of Patent: *Apr. 14, 2020

(54) SYSTEM AND METHOD FOR SPECTRUM SHARING AND INTERFERENCE MANAGEMENT BETWEEN WIRELESS SYSTEMS

(71) Applicant: Federated Wireless, Inc., Arlington, VA (US)

(72) Inventors: Masoud Olfat, Great Falls, VA (US); Kurt Schaubach, Arlington, VA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,535

(22) Filed: Sep. 27, 2018

(65) Prior Publication Data

US 2019/0053246 A1    Feb. 14, 2019

Related U.S. Application Data

(63) Continuation of application No. 15/069,565, filed on Mar. 14, 2016, now Pat. No. 10,117,256.
(Continued)

(51) Int. Cl.
*H04W 24/10* (2009.01)
*H04W 72/08* (2009.01)
(Continued)

(52) U.S. Cl.
CPC ............ *H04W 72/082* (2013.01); *H04L 5/00* (2013.01); *H04L 5/0062* (2013.01);
(Continued)

(58) Field of Classification Search
CPC .......... H04W 72/082; H04W 72/0453; H04W 72/1205; H04W 72/0413; H04W 16/14;
(Continued)

(56) References Cited

U.S. PATENT DOCUMENTS

2007/0280096 A1* 12/2007 Yanover ................ H04W 52/04
370/201
2008/0057934 A1    3/2008 Sung et al.
(Continued)

*Primary Examiner* — Faruk Hamza
*Assistant Examiner* — Jean F Voltaire
(74) *Attorney, Agent, or Firm* — Finnegan, Henderson, Farabow, Garrett & Dunner, LLP

(57) ABSTRACT

A method of allocating resources in a first wireless system, wherein the first wireless system shares a frequency spectrum with a second wireless system, is described. The method comprises detecting a level of interference to the second wireless system caused by the first wireless system on a first frequency within the spectrum; determining if transmission on the first frequency should be restricted based on the level of interference; and restricting transmissions in the first system on the first frequency if it was determined that transmission on the first frequency should be restricted while allowing normal use of the remaining portions of the frequency spectrum to continue in the first system. A system for allocating resources in a first wireless system, wherein the first wireless system shares a frequency spectrum with a second wireless system, is also described.

26 Claims, 6 Drawing Sheets

Related U.S. Application Data

(60) Provisional application No. 62/132,669, filed on Mar. 13, 2015.

(51) Int. Cl.
| | |
|---|---|
| *H04W 72/12* | (2009.01) |
| *H04W 72/04* | (2009.01) |
| *H04L 29/08* | (2006.01) |
| *H04W 16/14* | (2009.01) |
| *H04L 5/00* | (2006.01) |
| *H04L 27/00* | (2006.01) |
| *H04L 12/26* | (2006.01) |
| *H04W 52/04* | (2009.01) |

(52) U.S. Cl.
CPC .......... *H04L 27/0006* (2013.01); *H04L 67/12* (2013.01); *H04L 67/32* (2013.01); *H04W 16/14* (2013.01); *H04W 72/0413* (2013.01); *H04W 72/0453* (2013.01); *H04W 72/1205* (2013.01); *H04L 5/0007* (2013.01); *H04L 43/16* (2013.01); *H04W 52/04* (2013.01); *H04W 72/042* (2013.01)

(58) Field of Classification Search
CPC .... H04W 52/04; H04W 72/042; H04L 67/12; H04L 67/32; H04L 5/00; H04L 43/16
USPC ........................................................ 370/330
See application file for complete search history.

(56) References Cited

U.S. PATENT DOCUMENTS

| | | | |
|---|---|---|---|
| 2010/0087149 | A1 | 4/2010 | Srinivasan et al. |
| 2012/0117566 | A1* | 5/2012 | Maeda .................... G06F 21/53 718/1 |
| 2013/0035041 | A1 | 2/2013 | Sen |
| 2013/0051351 | A1* | 2/2013 | Seo ...................... H04J 11/0056 370/329 |
| 2015/0245333 | A1 | 8/2015 | Hulkkonen |
| 2016/0050676 | A1* | 2/2016 | Sinnaduray ......... H04W 72/082 370/329 |
| 2016/0269137 | A1 | 9/2016 | Lindoff et al. |
| 2017/0223719 | A1* | 8/2017 | Huang ................. H04L 5/0057 |

\* cited by examiner

SYSTEM AND METHOD FOR SPECTRUM SHARING AND INTERFERENCE MANAGEMENT BETWEEN WIRELESS SYSTEMS

CROSS-REFERENCE TO RELATED APPLICATIONS

This application is a continuation of U.S. application Ser. No. 15/069,565, filed Mar. 14, 2016, which claims the benefit of U.S. Provisional Application Ser. No. 62/132,669, filed Mar. 13, 2015, each of which is hereby incorporated by reference in its entirety.

TECHNICAL FIELD

The present disclosure generally relates to spectrum sharing and interference management between wireless systems.

BACKGROUND

The proliferation of smartphones and other wireless devices has led to the ever-increasing demand for wireless spectrum. In an effort to ameliorate this problem, the U.S. Federal Communications Commission ("FCC") has opened up the 3550-3700 MHz band ("3.5 GHz band"), which has traditionally been reserved for military use, for shared-spectrum use. Shared-spectrum use has also been contemplated for the 1695-1710 MHz, 1755-1780 MHz, and 2155-2180 MHz bands (collectively, the "AWS-3" bands) during a transitional period when federal incumbent systems relocate out of the bands. When spectrum is shared, some mechanism must be adopted to ensure users of the same spectrum do not interfere with each other and users with higher priorities are guaranteed access to the spectrum in a situation of a conflict.

Using the 3.5 GHz band as an example, to protect existing users of the band, a three-tiered model has been adopted by the FCC, as Illustrated in FIG. 1. As shown in the figure, incumbent access (IA) users, shown as federal and non-federal incumbent systems, are positioned at the top tier and have the highest priority. One or more Spectrum Access Systems ('SASs') may facilitate spectrum sharing between the Incumbent users and public users, such as commercial cellular operators, emergency vehicles, police, etc. Among the public users, some may obtain higher priority under a Priority Access License ("PAL"), while others may operate under General Authorized Access ("GAA"), i.e., without a license, but with the lowest priority. A spectrum access system ("SAS") may facilitate the three-tiered model by ensuring that devices in a lower-priority access tier do not interfere with those in a higher-priority tier. The SAS may accomplish this by monitoring interference and dynamically assigning frequency bands to devices operating in the shared spectrum. It will be understood that a "frequency" may be a frequency band, a frequency channel, or a channel, and vice versa.

The public use devices, i.e., the PAL and GAA devices, may each operate or run a communications system and communicate with end user devices, such as smartphones or other portable devices carried by end users, via any suitable wireless communication technologies or standard protocols, such as Long Term Evolution (LTE), Wideband Code Division Multiple Access (WCDMA), Global System for Mobile Communications (GSM), etc. The SAS coordinates and manages spectrum sharing among the incumbents, the PAL systems, and the GAA systems, by assigning spectrum to the PAL and GAA devices as requested for use by the respective systems, while at the same time ensuring that the PAL and GAA devices and systems do not interfere with the incumbents, that the GAA systems do not interfere with the incumbents and the PAL systems, and that the PAL users do not interfere with each other.

When the systems are in close proximity with one another, functions of the SAS alone may be insufficient to avoid harmful interference. Assistance from the individual systems may be necessary to ensure interference stays at a permissible level.

SUMMARY

The present disclosure is directed to systems and methods for spectrum sharing and interference management between wireless systems.

Consistent with at least one disclosed embodiment, a method is disclosed for allocating resources in a first wireless system, wherein the first wireless system shares a frequency spectrum with a second wireless system. In one embodiment this may be accomplished by detecting a level of interference to the second wireless system caused by the first wireless system on a first frequency within the spectrum; determining if transmission on all or a portion of the first frequency should be restricted based on the level of interference; and restricting transmissions in the first system on the first frequency if it was determined that transmission on all or a portion of the first frequency should be restricted while allowing normal use of the remaining portions of the frequency spectrum to continue in the first system.

Consistent with at least one disclosed embodiment, a wireless communications system is disclosed for allocating resources in a first wireless system. In one embodiment this may be accomplished with a first wireless system that shares a frequency spectrum with a second wireless system; at least one sensor configured to detect a level of interference to the second wireless system caused by the first wireless system on a first frequency within the spectrum; and at least one processor configured to receive the level of interference, determine if transmission on all or a portion of the first frequency should be restricted based on the level of interference, and generate at least one instruction for the first system to restrict transmissions therein on the first frequency if it was determined that transmission on the first frequency should be restricted while allowing use of the remaining portions of the frequency spectrum to continue in the first system.

Consistent with at least one disclosed embodiment, a wireless communications device is disclosed for allocating resources in a first wireless system. In one embodiment this may be accomplished with at least one receiver configured to receive from a sensor a level of interference caused by a first wireless system on a first frequency within a frequency spectrum to a second wireless system, wherein the first wireless system shares the spectrum with the second wireless system; at least one processor configured to receive the level of interference, determine if transmission on the first frequency should be restricted based on the level of interference, and generate at least one instruction for the first system to restrict transmissions therein on the first frequency if it was determined that transmission on the first frequency should be restricted while allowing use of the remaining portions of the frequency spectrum to continue in the first system; and at least one transmitter configured to transmit the instruction to the first wireless system.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

Figure 1:
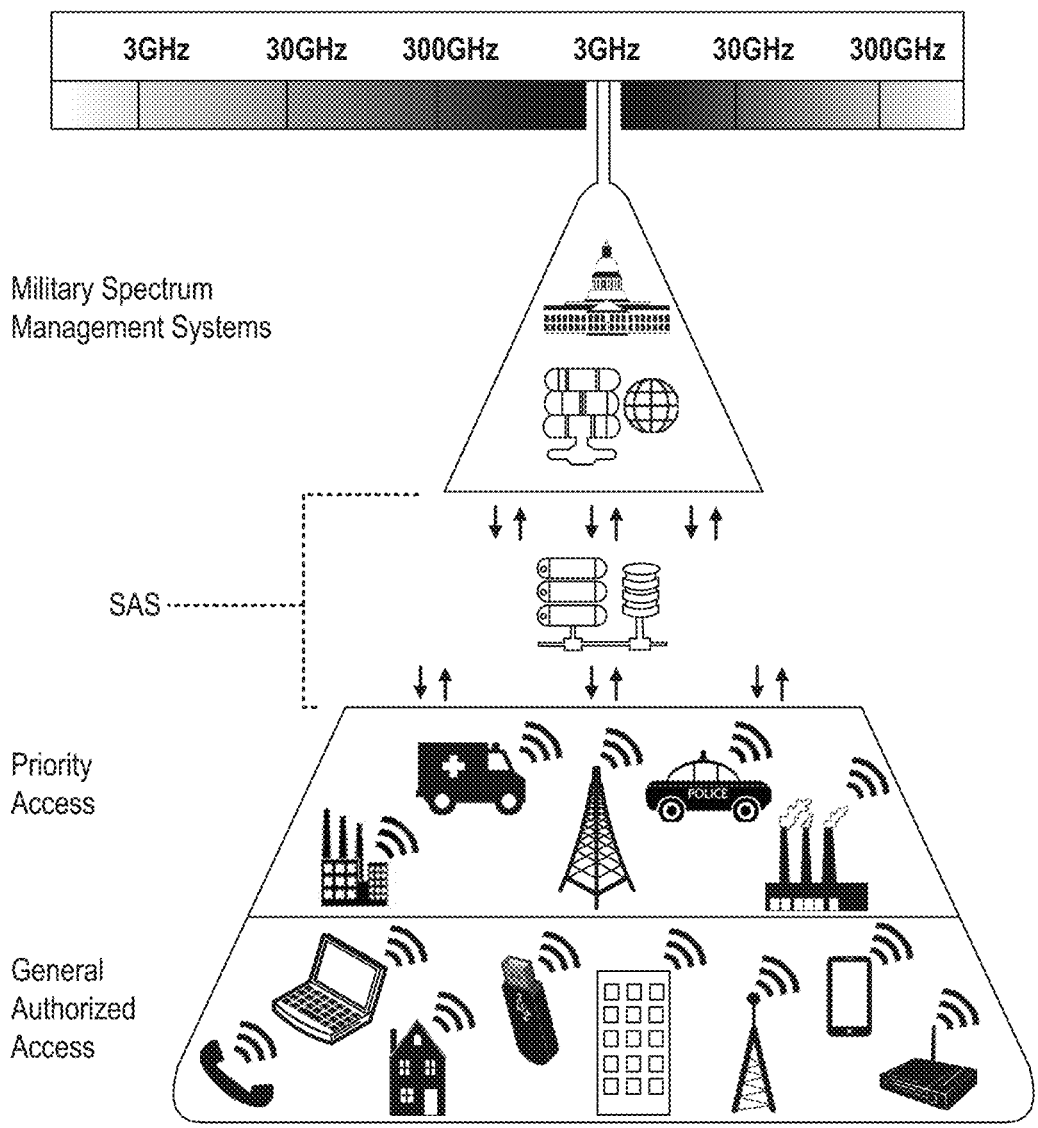
FIG. 1 illustrates a three-tiered model adopted by the FCC for a shared-spectrum system.

The following detailed description refers to the accompanying drawings. Wherever possible, the same reference numbers are used in the drawings and the following description to refer to the same or similar parts. While several Illustrative embodiments are described herein, modifications, adaptations and other implementations are possible. For example, substitutions, additions or modifications may be made to the components illustrated in the drawings, and the Illustrative methods described herein may be modified by substituting, reordering, removing, or adding steps to the disclosed methods. Accordingly, the following detailed description is not limited to the disclosed embodiments and examples. Instead, the proper scope is defined by the appended claims.

LTE has been widely deployed in the U.S. In a shared-spectrum system, such as the three-tiered model adopted by FCC for the 3.5 GHz band, many PAL and GAA users will likely choose LTE as their wireless communication standard and their LTE systems will coexist with non-LTE systems. LTE employs orthogonal frequency division multiplexing (OFDM) technology, where the frequency band is divided into a number of smaller orthogonal frequency bands called subcarriers. The subcarriers may be grouped into Physical Radio Resource Blocks (PRBs), each containing 12 subcarriers over seven OFDM symbols. Seven OFDM symbols may comprise a 0.5 millisecond slot. End user devices can be assigned the subcarriers according to a scheduling algorithm in the system. The term "frequency" as used in this disclosure may refer to frequency band, a singular frequency, a subcarrier, or a group of subcarriers.

Consistent with embodiments of the present invention, an LTE system coexisting with other system(s) in a shared-spectrum network allocates spectrum, subcarriers, or spectrum resources to its end users such that the LTE system does not utilize the spectrum used by another system in close proximity, so as to reduce interference to the other system if the other system has a higher priority. This "blanking" or "notching" of otherwise allocable spectrum may be permanent or dynamic. Blanking may be used, for example, in an LTE system on PAL so that the system would avoid using a portion of its spectrum if that portion is used by a nearby incumbent user, and in an LTE system on GAA so that the system would avoid using a portion of its spectrum if that portion is used by nearby Incumbent users or PAL users.

Descriptions of embodiments are provided below using the example of an LTE system and the three-tiered model adopted by the FCC, but are not limited to such.

Figure 2:
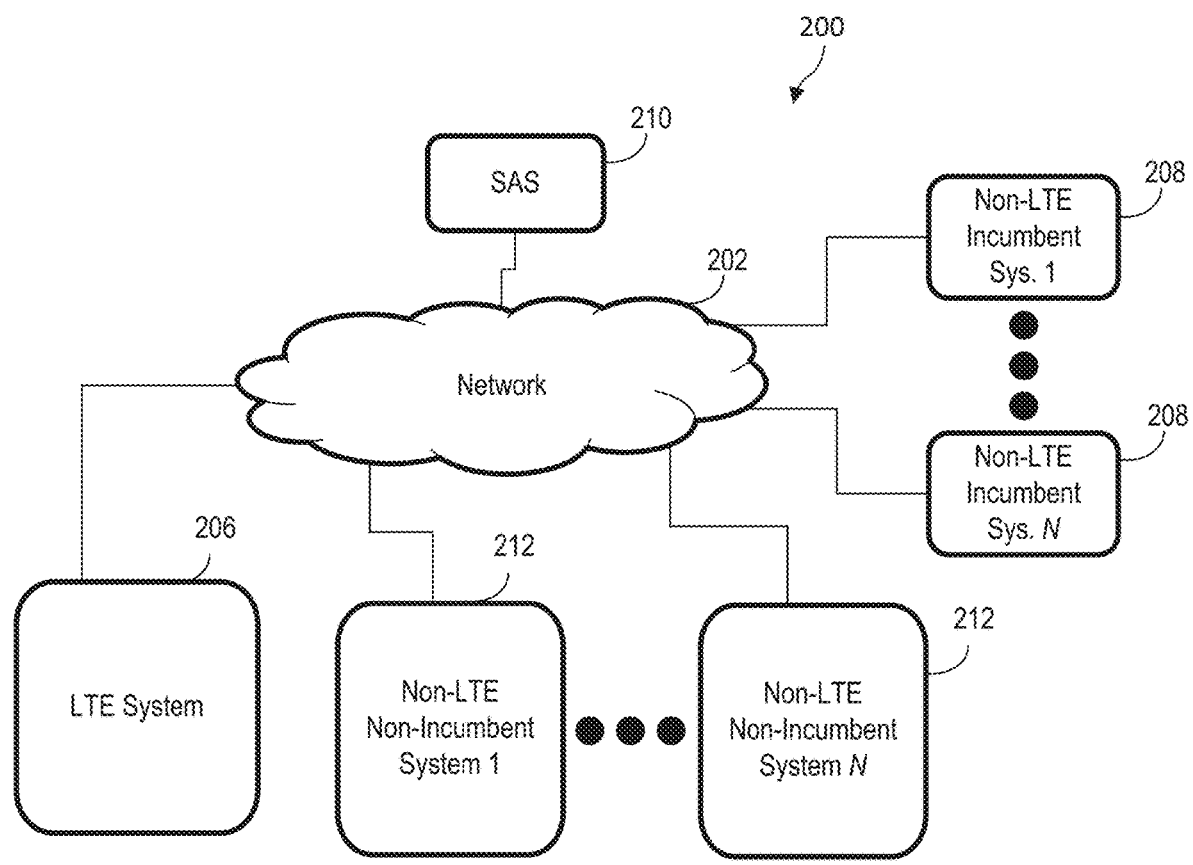
FIG. 2 illustrates an exemplary shared-spectrum system for implementing methods and systems consistent with the present disclosure.

FIG. 2 illustrates an exemplary shared-spectrum system 200 consistent with the present disclosure. System 200 includes a network 202 to which all devices of the system connect, one or more LTE systems 206, non-LTE Incumbent systems ("incumbents") 208, one or more SASs 210, and/or other non-LTE, non-incumbent systems 212. Network 202 may comprise any suitable network such as the Internet, a wide area network, or any other network that permits exchange of information between various components of the system. LTE system 206 may comprise, for example, cellular network base stations, emergency vehicles, or any other system that does not have incumbent status. In the three-tiered model shown in FIG. 1, LTE system 206 may be operating on PALs or as GAAs. In the example of the 3.5 GHz band, non-LTE incumbents 208 may comprise systems used by branches of armed forces, for example, U.S. Department of Defense air surveillance radar systems, or devices used by other government operators. Non-LTE, non-incumbent systems 212 may comprise, for example, Wi-Fi networks or other telecommunication networks using Wideband Code Division Multiple Access (WCDMA), Global System for Mobile Communication (GSM), or any other suitable technology. SAS 210 coordinates and manages spectrum sharing among non-LTE incumbents 208, LTE system 206, and non-LTE, non-incumbent systems 212 by assigning spectrum to LTE system 206 as requested, while at the same time ensuring that the LTE system 206 and non-LTE, non-incumbent systems 212 do not interfere with non-LTE incumbents 208. SAS 210 may facilitate spectrum sharing by notifying LTE system 206 and non-LTE, non-incumbent systems 212 what frequencies they may operate on, when they should vacate certain frequencies, or what power level they may transmit at. All of the LTE system 206, incumbent non-LTE systems 208, SASs 210, and non-LTE, non-incumbent systems 212 may include necessary components to facilitate wireless communication among them. Such components may include antennas, transmitters, receivers, and/or transceivers. They may also include processors for processing and generating signals.

Figure 3:
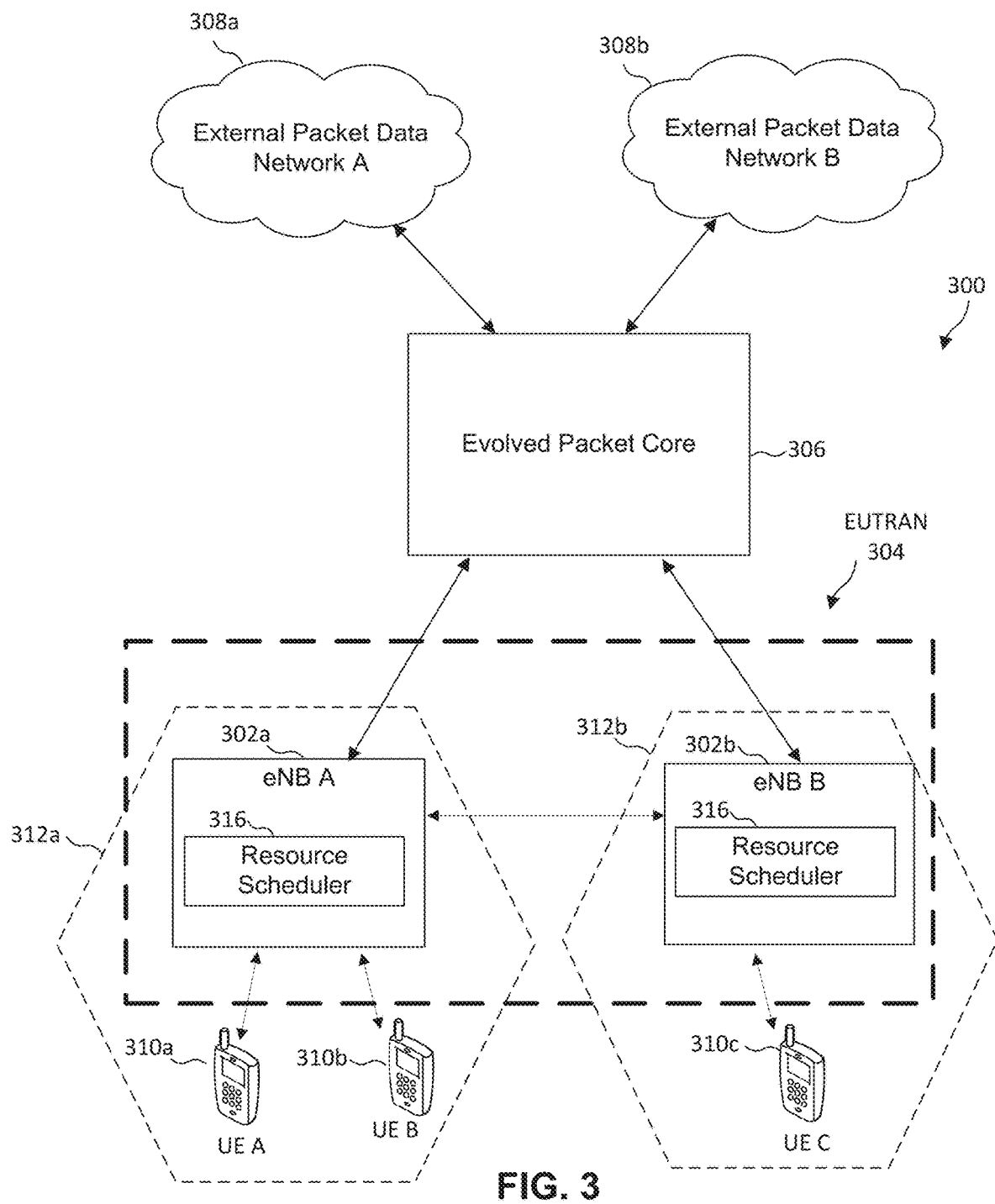
FIG. 3 illustrates an exemplary architecture of an LTE system.

LTE system 206 may communicate with end user devices, or user equipment ("UE"), such as smartphones or other portable devices carried by end users. FIG. 3 illustrates an exemplary architecture of LTE system 206 by reference to an exemplary LTE system 300. LTE system 300 may include end user devices or UE 310 (310a, 310b, 310c), an Evolved Universal Terrestrial Radio Access Network (E-UTRAN) 304, and an evolved packet core (EPC) 306. E-UTRAN 304 may include one or more base stations 302 (302a, 302b), also referred to as eNode B or eNB, which control radio communications of UE 310 within their respective cells. EPC 306 communicates between E-UTRAN 304 and external packet data networks 308 (308a, 308b, etc.) Each eNB 302 may Include a Resource Scheduler 316 that assigns frequency resources to UE 310. One flavor of the LTE standards is the so-called frequency division duplexing (FDD), where different frequency bands are assigned for communications from UE to eNB (uplink) and communications from eNB to UE (downlink). LTE standards also provide for use of the same frequency band on both the uplink and downlink but at alternating times, a scheme referred to as time division duplexing (TDD).

Figure 4:
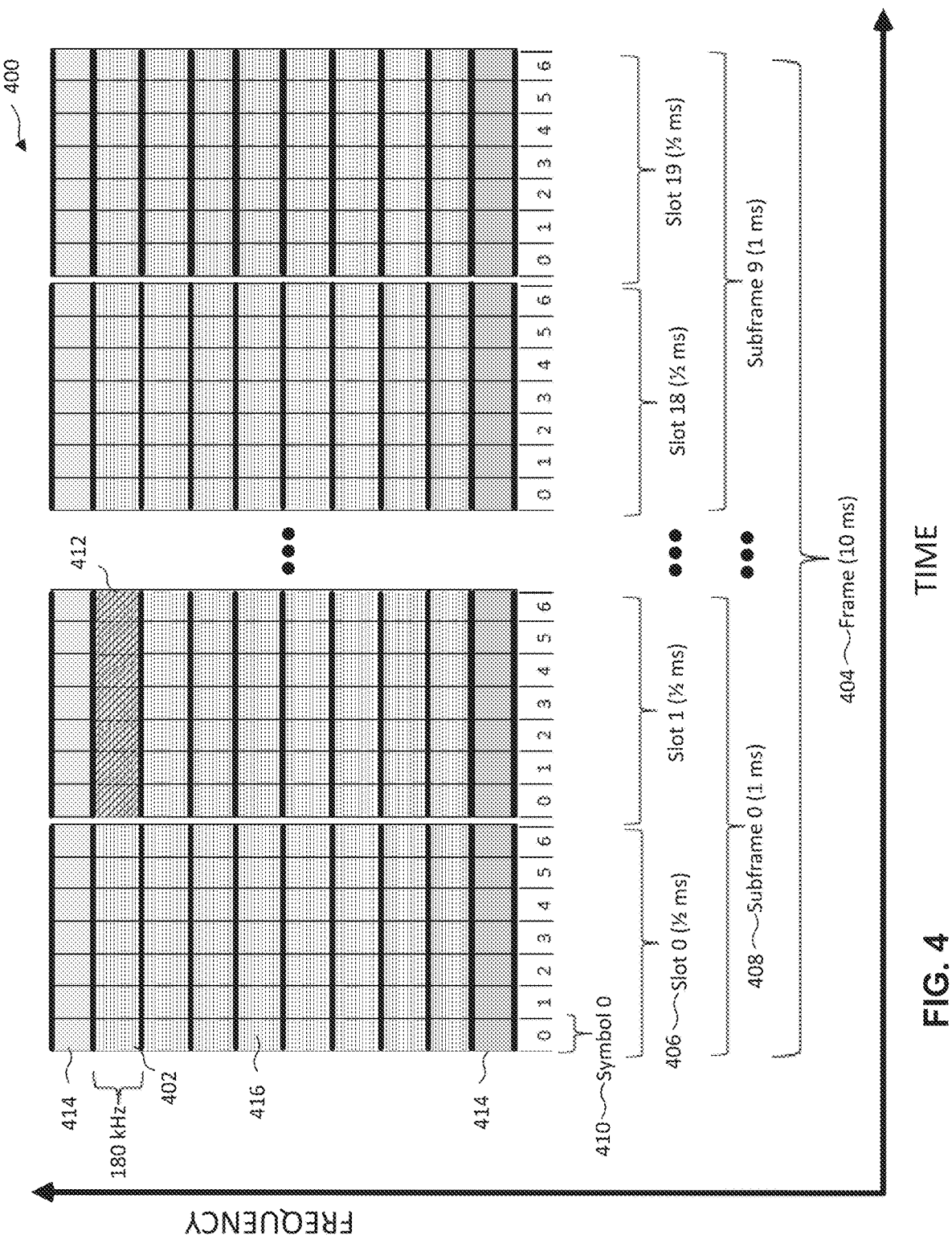
FIG. 4 illustrates an exemplary time-frequency resource grid structure for uplink communications in accordance with an embodiment of the present disclosure.

Using FDD LTE as an example, FIG. 4 shows a type-1 time-frequency resource grid structure 400 for normal LTE FDD uplink communications, where the horizontal axis Indicates time and the vertical axis Indicates frequency. Type-2 time-frequency resource grid structure, not shown, may be used for normal LTE TDD uplink communications. In the exemplary type-1 resource grid structure shown in FIG. 4, the frequency band is divided into a number of 15 kHz orthogonal narrower frequency bands or subcarriers 402. A time frame 404 of ten milliseconds is also defined for uplink transmissions. Each time frame 404 may be divided into time slots 406 that are each 0.5 milliseconds. Two slots 406 make up a 1-millisecond subframe 408. Each time slot 406 is further divided into seven symbol units 410.

Resources in the form of subcarriers and symbol units are assigned for UE 310 to transmit to base stations 302 on the uplink. The smallest assignable block of resources, referred to as the physical radio block (PRB), labeled in the figure as 412, comprises, for example, 12 subcarriers with a total of 180 kHz bandwidth spanning over one time slot 406 or seven symbol units 410. Thus, a 10 MHz frequency band containing a 1 MHz guard band has 9 MHz bandwidth divided into 50 (=9 MHz/180 kHz) PRBs in parallel. Different UEs 310 may transmit over different PRBs across the frequency band at the same time, and one UE 310 may transmit on multiple PRBs consecutive in frequency. Resource scheduler 316 is responsible for allocating PRBs to UE 310 within the corresponding cell based on need and availability. The uppermost and lowermost portions, or the edges, of the band are generally designated as Physical Uplink Control Channels (PUCCHs) 414. Other portions of the band may be designated as Physical Uplink Shared Channels (PUSCHs) 416. PUCCHs 414 are used to carry uplink control information, and PUSCHs 416 are used for transmitting UE data.

Figure 5:
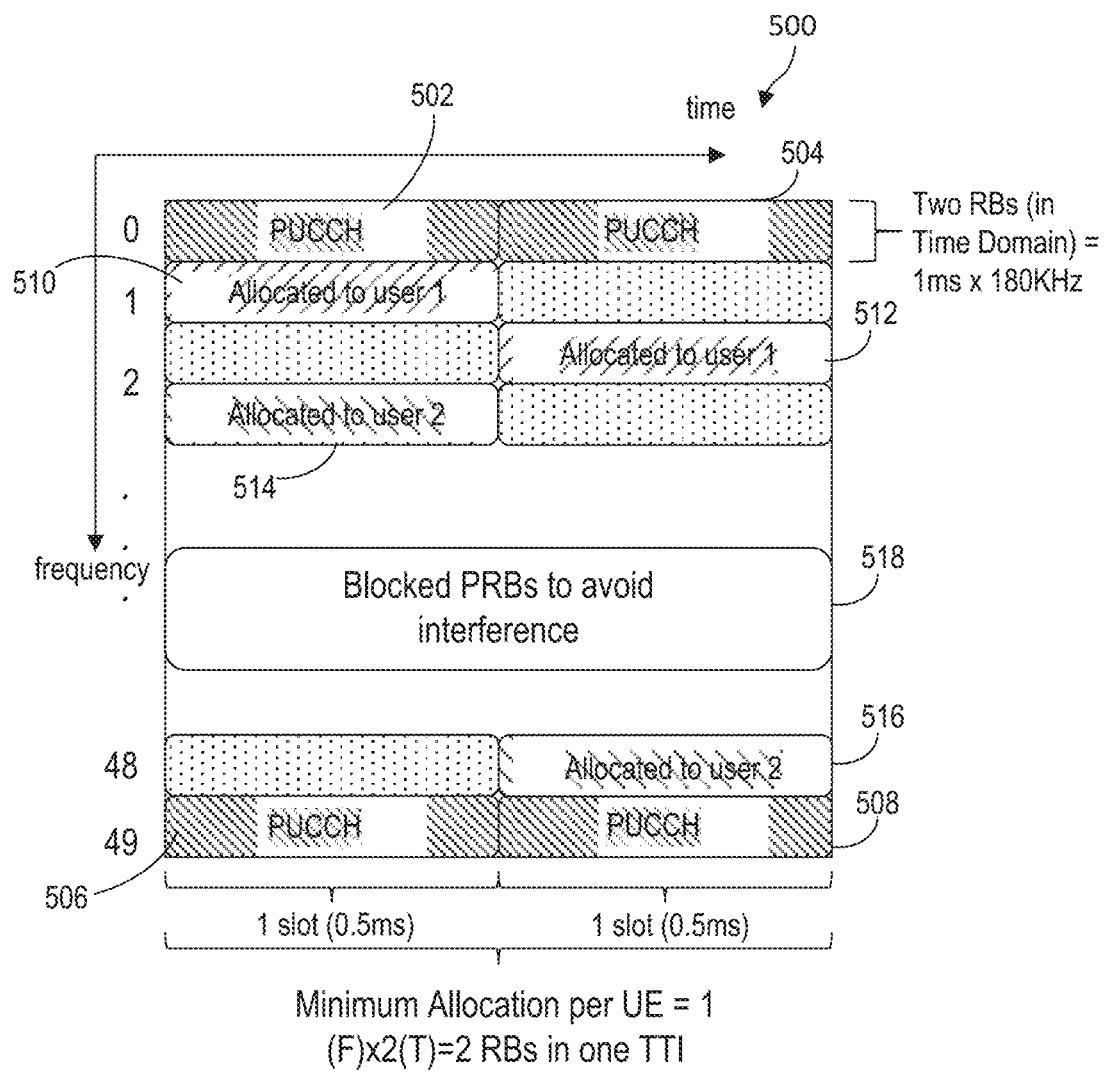
FIG. 5 illustrates an exemplary use restriction of a portion of otherwise available bandwidth, in accordance with an embodiment of the present disclosure.

Consistent with embodiments of the present disclosure, when operations of LTE system 206 cause harmful interference to a non-LTE incumbent system 208 or a higher priority system, either because they are in close physical proximity or for any other reason, it may be necessary for the LTE system to restrict, eliminate, notch, or blank interfering signals. FIG. 5 illustrates an example where use of a portion of the otherwise available bandwidth is restricted so resource scheduler 316 does not assign PRBs within the portion of the bandwidth to UE 310 in the uplink. As shown in FIG. 5, PRBs 502, 504, 506, and 508 in the edge portions of the frequency band are allocated for PUCCH transmission. Resource scheduler 316 assigns a minimum of 2 PRBs to a piece of UE for PUSCH transmission. For example, PRBs 510 and 512 are allocated to user 1 and PRBs 514 and 516 are allocated to user 2. A certain frequency within the PUSCH region of the frequency band may be used by higher-priority systems (such as incumbent systems 208). To avoid harmful interference, resource scheduler 316 may restrict the use of PRBs via blocking or blanking or notching so that UE on LTE system 206 does not transmit on those PRBs at or around the certain frequency. In one aspect, resource scheduler 316 may block the use of a PRB such that no UE may transmit on the PRB. Alternatively, resource scheduler 316 may Instruct UE 310 to reduce transmission power to below a harmful level. In one aspect, resource scheduler 316 may issue instructions based on Information received from SAS 210 to achieve the blocking, blanking, notching, or reduced transmission power. In another aspect, SAS 210 may provide instructions to resource scheduler 316 to block the use of a PRB. It will be appreciated by those skilled in the art that the blocked spectrum resource may be any smallest group of subcarriers or a frequency-time segment used by the wireless system for scheduling and is not limited to PRBs in an LTE system. Such smallest allocable spectrum resource may be generally referred to as a "scheduling unit."

In one aspect, the blocking or blanking or notching may be permanent, so that LTE system 206 never uses those PRBs in the neighborhood of the frequency used by the higher priority system and resource scheduler 316 never assigns such PRBs to UE 310. In another aspect, resource scheduler 316 dynamically restricts use of the PRBs within the potentially interfering portion of the frequency band. In the example shown in FIG. 5, resource scheduler 316 blocks a region 518 over a subframe and a plurality of PRBs and may unblock the use of the PRBs in a subsequent subframe. Resource scheduler 316 may continue to assign other portions of the bandwidth to UE 310 for normal use.

In one aspect, resource scheduler 316 communicates with SAS 210 to determine if any portion of the uplink frequency band is used by a higher priority system such as an incumbent user and if transmissions from UE 310 in the cell cause significant interference to the higher-priority system, to receive Instructions as to how to use an uplink frequency, or to confirm that use of an uplink frequency is permitted. In that regard, system 200 may further include one or more sensors (not shown) that sense spectrum usage and report the sensed Information to SAS 210 to facilitate detection of frequency use by various systems. The sensors may comprise any device suitable for detecting wireless transmissions and determining spectrum usage, such as antennas, radars, etc. The sensors may be distributed over the area covered by the network, either installed within systems 206, 208, 212, or separately from those devices. The sensors may be mobile or in fixed locations. Alternatively, end user devices may also sense the environment and report measurements to the systems 206, 208, and/or 212, which may then report the Information to SAS 210. Existing sensors, such as those for sensing and detecting incumbent users, may also gather and forward frequency use information to SAS 210.

Information gathered from the sensors may identify devices or systems, the relative priority (i.e., incumbent vs. PAL vs. GAA), frequency ranges used by the systems, the time period of such use, transmission power, and/or a tolerance level for interference. SAS 210 communicates such information to LTE system 206, and LTE system 206 determines whether and when to restrict use of certain PRBs that might cause harmful interference to a system with a higher priority of use than LTE system 206. Resource scheduler 316 may simply decide to permanently block the use of all PRBs within the entire frequency spectrum used by a higher-priority system. But that may be inefficient. Interference varies across the frequency spectrum and maybe only a small portion of the spectrum is more susceptible to harmful interference, in which case only the use of PRBs within the small portion need to be blocked or restricted. SAS 210 or LTE system 206 may calculate the level of interference and determine that potential interference is harmful if it exceeds a certain threshold level generated from empirical data or provided by SAS 210. Alternatively, or in addition, the higher-priority system's use of the spectrum may be temporary, in which case the use of PRBs that might cause harmful interference only needs to be blocked or restricted for a limited period of time. Resource scheduler 316 may also employ other criteria in deciding whether and when restricting or blocking the use of PRBs should take place, such as the absolute priority level of the incumbent system that might be harmed by the interference. For example, if LTE system 206 is a GAA system, resource scheduler 316 may give incumbent systems 208 a higher level of deference than PAL users, such that a lower threshold will be used for blocking or restricting use of PRBs that might cause harmful interference to incumbent users than to PAL users.

Determination of the level of possible interference and/or whether blocking or restricting the use of PRBs is necessary may be performed by either a SAS 210, or a component within the LTE system 206 based on the information received from the SAS 210. SAS 210 generally has access to much more frequency use data, and can perform necessary computation on a server or in the cloud, and provide the computation results to LTE system 206. SAS 210 can also provide sufficient frequency use data to LTE system 206 such that a component thereof (such as a processor within eNB 302) can perform the computation.

Proper operation of LTE system 206 requires PUCCH assignment at all times. Therefore, resource scheduler cannot block PUCCHs 502. In the event transmissions on the PRBs for PUCCH cause harmful interference to a higher-priority system, resource scheduler 316 may allocate a different set of PRBs for PUCCH and restrict or block the use of the PRBs originally assigned for PUCCH. This may be called an "over-provisioned PUCCH."

Consistent with embodiments of the present disclosure, resource scheduler 316 may include necessary hardware and/or software that interacts with SAS 210 to gather frequency use or Interference data and determines, based on the gathered information, whether certain subcarriers within a time frame should be blanked. The scheduling of PRBs according to the above-described blocking/blanking/notching scheme may be easily implemented as a software update in resource scheduler 316.

Figure 6:
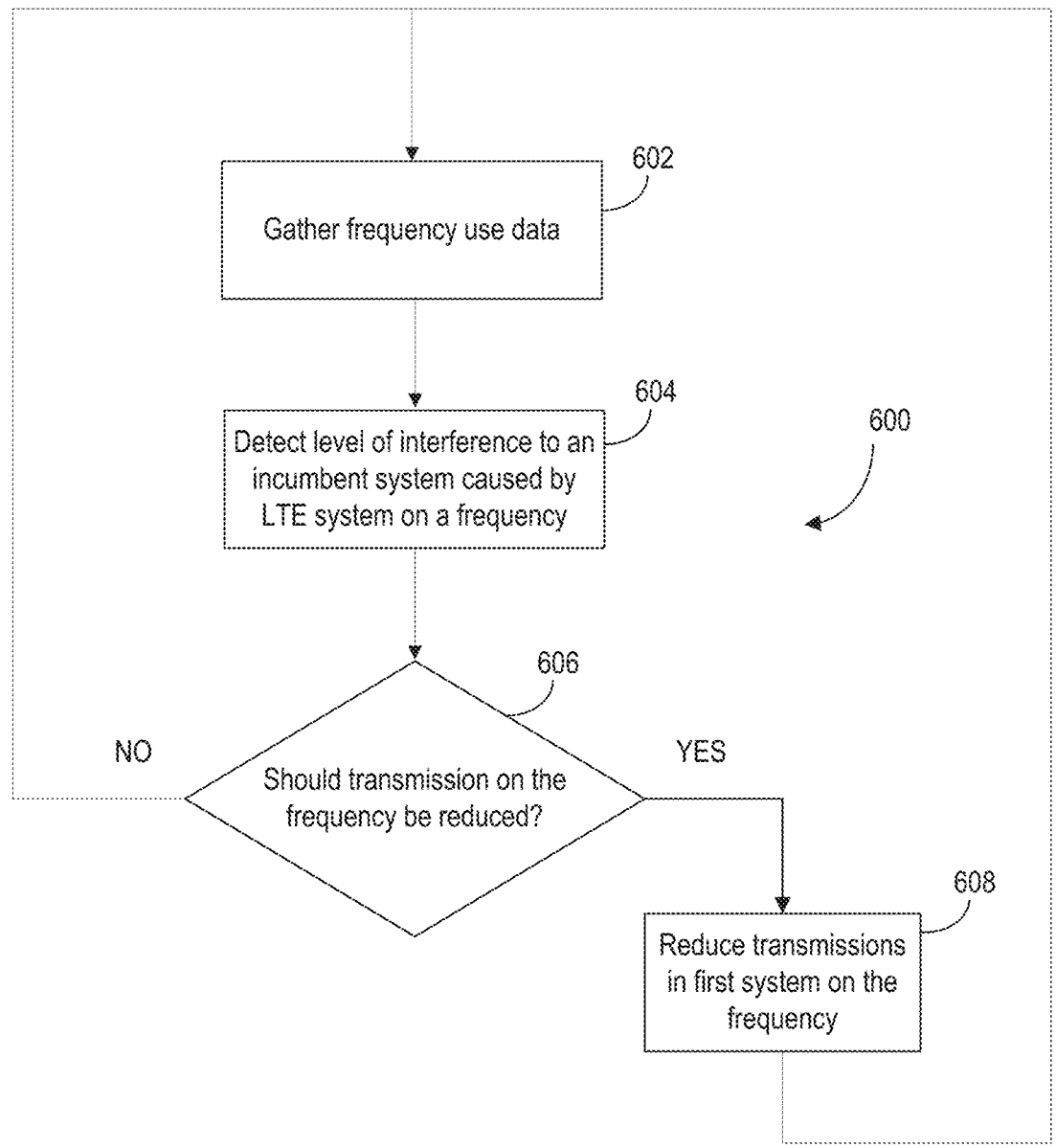
FIG. 6 is a flow diagram illustrating an exemplary method for allocating resources in a shared-spectrum system, in accordance with an embodiment of the present disclosure.

FIG. 6 is a flow diagram illustrating an exemplary method 600 consistent with embodiments of the present disclosure. At Step 602, frequency use data is gathered for the frequency band used by LTE system 206 and particular frequency or frequencies are identified if they are used by another system (such as non-LTE incumbent system 208) with a higher priority than LTE system 206 in the shared-spectrum system. The gathering of the data at Step 602 may be performed by SAS 210 in coordination with other devices or components in the system, as described above.

At Step 604, the level of potential interference on a particular frequency from LTE system 206 to the other system is detected. This detection may be performed by LTE system 206 (such as resource scheduler 316) based on frequency use data provided by SAS 210, or by SAS 210, or by both.

At Step 606, a determination is made as to whether transmissions on the particular frequency should be reduced. The determination may be made by the SAS 210, or LTE system 206 (such as resource scheduler 316) based on Information received from SAS 210. The determination may comprise determining whether the interference level exceeds a threshold. If so, transmissions on the particular frequency or corresponding PRBs may be reduced (Step 608). In one aspect, transmission power from UE on the cell must be reduced to a permissible level or lower. Alternatively, resource scheduler 316 may simply block transmissions on the particular frequency or corresponding PRBs completely.

As discussed above and as shown in FIG. 6, method 600 may repeat the determination of whether transmissions on a frequency or corresponding PRBs should be blocked or reduced to achieve a dynamic and efficient PRB schedule in LTE system 208.

Although the above descriptions use LTE as an example, it should be apparent to one skilled in the art that the system and method consistent with the present disclosure may be implemented with any multi-carrier system or the like that allows division of the frequency spectrum into subcarriers, or smaller frequency bands, and assigns spectrum on the basis of the subcarriers or smaller frequency bands. The scheduling granularity in LTE systems is at the PRB level. This method can be generalized to other radio technologies with different scheduling units, such as individual or a group of subcarriers or frequency bands over any suitable time periods.

The systems and methods described above may be implemented by any hardware, software, or a combination of hardware and software having the above-described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and Illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some Interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of allocating resources in a first wireless system, wherein the first wireless system shares a frequency spectrum with a second wireless system, the method comprising:
   receiving a level of interference to the second wireless system caused by the first wireless system on a first frequency within the frequency spectrum, the level of interference having been detected by at least one sensor separate from the first wireless system;
   determining if transmission on the first frequency in the first wireless system should be restricted based on the level of interference; and restricting transmissions on the first frequency in the first wireless system if it was determined that transmission on the first frequency should be restricted, wherein the second wireless system is a non-cellular wireless system.

2. The method of claim 1, wherein the first wireless system schedules signal transmissions by allocating scheduling units, where a scheduling unit is a frequency-time resource.

3. The method of claim 2, wherein restricting transmission on the first frequency comprises restricting transmission on the corresponding scheduling units.

4. The method of claim 1, wherein the first wireless system is an LTE wireless system, the frequency spectrum is divided into a plurality of orthogonal subcarriers, wherein the first wireless system schedules signal transmissions based on physical resource blocks (PRB), each PRB being a frequency-time resource containing one or more subcarriers over a time period, and wherein the first frequency corresponds to one or more PRBs.

5. The method of claim 4, wherein the one or more PRBs corresponding to the first frequency carry physical uplink shared channel (PUSCH) transmissions.

6. The method of claim 4, wherein the one or more PRBs corresponding to the first frequency carry physical uplink control channel (PUCCH) transmissions.

7. The method of claim 1, wherein restricting transmissions in the first wireless system on the first frequency comprises blocking transmission on the first frequency.

8. The method of claim 1, wherein restricting transmissions in the first wireless system on the first frequency comprises instructing one or more devices in the first wireless system to reduce the power of transmissions on the first frequency.

9. The method of claim 1, wherein restricting transmissions in the first wireless system on the first frequency is for a limited period of time.

10. The method of claim 1, wherein the second wireless system is an incumbent military use network.

11. The method of claim 1, further comprising detecting frequency use over the frequency spectrum by a second wireless system prior to receiving the level of interference to the second wireless system.

12. The method of claim 11, further comprising repeating the steps of receiving the level of interference, determining if transmission on the first frequency should be restricted, and restricting transmissions on the first frequency in the first wireless system, wherein the first frequency may vary between repetitions.

13. The method of claim 1, wherein determining if transmission on the first frequency should be restricted comprises determining whether the level of interference exceeds a threshold.

14. A wireless communications system, comprising:
a first wireless system;
a second wireless system wherein the first and second wireless system share a frequency spectrum, and wherein the second wireless system is a non-cellular wireless system;
at least one sensor separate from the first wireless system and configured to detect a level of interference to the second wireless system caused by the first wireless system on a first frequency within the frequency spectrum; and
at least one processor configured to:
receive the level of interference,
determine if transmission on the first frequency in the first wireless system should be restricted based on the level of interference, and
generate at least one instruction for the first system to restrict transmissions on the first frequency in the first wireless system if it was determined that transmission on the first frequency should be restricted.

15. The system of claim 14, wherein the first wireless system schedules signal transmissions by allocating scheduling units, where a scheduling unit is a frequency-time resource.

16. The system of claim 15, wherein restricting transmission on the first frequency comprises restricting transmission on the corresponding scheduling units.

17. The system of claim 14, wherein the first wireless system is an LTE wireless system, the frequency spectrum is divided into a plurality of orthogonal subcarriers, wherein the first wireless system schedules signal transmissions based on physical resource blocks (PRB), each PRB being a frequency-time resource containing one or more subcarriers over a time period, and wherein the first frequency corresponds to one or more PRBs.

18. The system of claim 17, wherein the one or more PRBs corresponding to the first frequency carry physical uplink shared channel (PUSCH) transmissions.

19. The system of claim 17, wherein the one or more PRBs corresponding to the first frequency carry physical uplink control channel (PUCCH) transmissions.

20. The system of claim 14, wherein the instruction for the first wireless system to restrict transmission on the first frequency comprises an instruction to block transmission on the first frequency.

21. The system of claim 14, wherein the instruction for the first wireless system to restrict transmission on the first frequency comprises an instruction for one or more devices in the first wireless system to reduce the power of the transmissions on the first frequency.

22. The system of claim 14, wherein the instruction for the first wireless system to restrict transmission on the first frequency comprises an instruction to restrict the transmission for a limited period of time.

23. The system of claim 14, wherein the second wireless system is an incumbent military use network.

24. The system of claim 14, wherein the at least one sensor is further configured to detect frequency use by the second wireless system over the frequency spectrum prior to receiving the level of interference to the second wireless system.

25. The system of claim 24, wherein:
the at least one sensor is further configured to repeat the detection of frequency use and of the level of interference, wherein the first frequency may vary between repetitions; and
the at least one processor is further configured to repeat the determination and repeat the generation of the at least one instruction, wherein the first frequency may vary between repetitions.

26. The system of claim 14, wherein the processor is further configured to perform a determination of whether transmission on the first frequency should be restricted, wherein the determination is based on whether the level of interference exceeds a threshold.

* * * * *